United States Patent
Lee et al.

(10) Patent No.: US 12,462,963 B2
(45) Date of Patent: Nov. 4, 2025

(54) WIRELESS CHARGING DEVICE AND MOVING MEANS INCLUDING SAME

(71) Applicant: SKC CO., LTD., Gyeonggi-do (KR)

(72) Inventors: Seunghwan Lee, Gyeonggi-do (KR); Tae Kyoung Kim, Gyeonggi-do (KR); Jong Hak Choi, Gyeonggi-do (KR); Nah Young Kim, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 842 days.

(21) Appl. No.: 17/765,819

(22) PCT Filed: Oct. 29, 2020

(86) PCT No.: PCT/KR2020/014939
§ 371 (c)(1),
(2) Date: Mar. 31, 2022

(87) PCT Pub. No.: WO2021/086071
PCT Pub. Date: May 6, 2021

(65) Prior Publication Data
US 2022/0328232 A1    Oct. 13, 2022

(30) Foreign Application Priority Data

Oct. 29, 2019 (KR) .................. 10-2019-0135513
Oct. 29, 2019 (KR) .................. 10-2019-0135516

(51) Int. Cl.
*H01F 27/08*    (2006.01)
*B60L 53/12*    (2019.01)
(Continued)

(52) U.S. Cl.
CPC ............ *H01F 27/085* (2013.01); *B60L 53/12* (2019.02); *B60L 53/302* (2019.02); *H01F 27/10* (2013.01);
(Continued)

(58) Field of Classification Search
CPC ......... H01F 27/085; H02J 50/10; B60L 53/12
(Continued)

(56) References Cited

U.S. PATENT DOCUMENTS

2017/0063101 A1*    3/2017    Sultenfuss ............ H02J 7/0042
2017/0063137 A1*    3/2017    Sultenfuss ............ H02J 50/12
(Continued)

FOREIGN PATENT DOCUMENTS

| CN | 1554009 A | 12/2004 |
|----|-----------|---------|
| EP | 3195335 B1 | 4/2018 |

(Continued)

OTHER PUBLICATIONS

Office Action issued by the Korea Patent Office on Jan. 12, 2021.
(Continued)

*Primary Examiner* — Jack Chiang
*Assistant Examiner* — Suchin Parihar
(74) *Attorney, Agent, or Firm* — IP & T GROUP LLP (57) ABSTRACT

A wireless charging device according to one implementation embodiment comprises a flow path arranged inside a magnetic unit or at an adjacent portion, and has cooling fluid flowing into the flow path so as to come in contact with the magnetic unit, and thus the heat generated during wireless charging can be readily discharged. Therefore, the wireless charging device can be effectively useful for a moving means such as an electric vehicle that requires high-capacity power transmission between a transmitter and a receiver.

13 Claims, 8 Drawing Sheets

(51) Int. Cl.
  *B60L 53/302* (2019.01)
  *H01F 27/10* (2006.01)
  *H02J 50/00* (2016.01)
  *H02J 50/10* (2016.01)
  *H02J 50/70* (2016.01)

(52) U.S. Cl.
  CPC ............ *H02J 50/005* (2020.01); *H02J 50/10* (2016.02); *H02J 50/70* (2016.02)

(58) Field of Classification Search
  USPC .......................................................... 320/108
  See application file for complete search history.

(56) References Cited

U.S. PATENT DOCUMENTS

| | | | |
|---|---|---|---|
| 2017/0274778 A1 | 9/2017 | van Boheemen et al. | |
| 2017/0323843 A1* | 11/2017 | Ganguly | H10D 88/00 |
| 2017/0338023 A1 | 11/2017 | Ansari et al. | |
| 2018/0141451 A1* | 5/2018 | Totsuka | B60L 53/39 |
| 2018/0254136 A1 | 9/2018 | Ueda et al. | |
| 2018/0272882 A1* | 9/2018 | Fontana | B60L 53/60 |
| 2020/0091755 A1* | 3/2020 | Larsson | H02J 7/0044 |
| 2022/0037924 A1* | 2/2022 | Schrafel | H01F 38/14 |
| 2022/0407358 A1* | 12/2022 | Shostak | H01F 38/14 |
| 2024/0212909 A1* | 6/2024 | Cost | H02J 50/005 |

FOREIGN PATENT DOCUMENTS

| | | |
|---|---|---|
| JP | H10-229611 A | 8/1998 |
| JP | H10-261534 A | 9/1998 |
| JP | 2015-103722 A | 6/2015 |
| JP | 2016-171167 A | 9/2016 |
| JP | 2017-045792 A | 3/2017 |
| KR | 10-2011-0042403 A | 4/2011 |
| KR | 10-2017-0045317 A | 4/2017 |
| KR | 10-2018-0070061 A | 6/2018 |
| KR | 10-1971884 B1 | 4/2019 |
| WO | 0227254 A2 | 4/2002 |

OTHER PUBLICATIONS

Office Action for the Japanese Patent Application No. 2022-520631 issued by the Japanese Patent Office on Apr. 4, 2023.
Office Action for the Chinese Patent Application No. 202080076352.9 issued by the Chinese Patent Office on Nov. 9, 2023.

* cited by examiner

WIRELESS CHARGING DEVICE AND MOVING MEANS INCLUDING SAME

This application is a national stage application of PCT/KR2020/014939 filed on Oct. 29, 2020, which claims priority of Korean patent application number 10-2019-0135513 filed on Oct. 29, 2019 and Korean patent application number 10-2019-0135516 filed on Oct. 29, 2019. The disclosure of each of the foregoing applications is incorporated herein by reference in its entirety.

TECHNICAL FIELD

Embodiments relate to a wireless charging device and a transportation means comprising the same. More specifically, the embodiments relate to a wireless charging device with enhanced charging efficiency through a heat dissipation structure and a transportation means comprising the same such as an electric vehicle.

BACKGROUND ART

In recent years, the information and communication field is being developed at a very fast pace, and various technologies that comprehensively combine electricity, electronics, communication, and semiconductor are continuously being developed. In addition, as electronic devices tend to be more mobile, research on wireless communication and wireless power transmission technologies is being actively conducted in the communication field. In particular, research on a method for wirelessly transmitting power to electronic devices is being actively conducted.

The wireless power transmission refers to wirelessly transmitting power through space using inductive coupling, capacitive coupling, or an electromagnetic field resonance structure such as an antenna without physical contact between a transmitter that supplies power and a receiver that receives power. The wireless power transmission is suitable for portable communication devices, electric vehicles, and the like that require a large-capacity battery. Since the contacts are not exposed, there is little risk of a short circuit, and a charging failure phenomenon in a wired method can be prevented.

Meanwhile, as interest in electric vehicles has rapidly increased in recent years, interest in building charging infrastructure is increasing. Various charging methods have already appeared, such as electric vehicle charging using home chargers, battery replacement, rapid charging devices, and wireless charging devices. A new charging business model has also begun to appear (see Korean Laid-open Patent Publication No. 2011-0042403). In addition, electric vehicles and charging stations that are being tested begin to stand out in Europe. In Japan, electric vehicles and charging stations are being piloted, led by automakers and power companies.

PRIOR ART DOCUMENT (Patent Document 1) Korean Laid-open Patent Publication No. 2011-0042403

DETAILED DESCRIPTION OF INVENTION

Technical Problem

In the conventional wireless charging device used for electric vehicles, a magnetic material is disposed adjacent to the coil to enhance the wireless charging efficiency, and a metal plate for shielding is disposed to be spaced apart from the magnetic material by a predetermined interval.

A wireless charging device generates heat due to the resistance of a coil and the magnetic loss of a magnetic material during the wireless charging operation. In particular, the magnetic material in a wireless charging device generates heat in a part close to the coil with a high electromagnetic wave energy density. The generated heat may change the magnetic characteristics of the magnetic material and cause an impedance mismatch between the transmitter and receiver, which deteriorates the charging efficiency. As a result, the generation of heat is, in turn, aggravated. However, since such a wireless charging device is installed in the lower part of an electric vehicle, a sealed structure is adopted for dustproofing, waterproofing, and shock absorption. Thus, it is difficult to implement a heat dissipation structure.

As a result of research conducted by the present inventors, it has been discovered that if a channel is provided inside or adjacent to the magnetic unit adopted in a wireless charging device, heat can be readily discharged through a refrigerant.

Accordingly, the problem to be solved by the embodiment is to provide a wireless charging device with enhanced heat dissipation and a transportation means comprising the same.

Solution to Problem

According to an embodiment, there is provided a wireless charging device, which comprises a coil unit; a shield unit disposed on the coil unit; a magnetic unit disposed between the coil unit and the shield unit; and a channel provided inside or adjacent to the magnetic unit, wherein a fluid for cooling is introduced into the channel and comes into contact with the magnetic unit.

According to another embodiment, there is provided a transportation means, which comprises a wireless charging device, wherein the wireless charging device comprises a coil unit; a shield unit disposed on the coil unit; a magnetic unit disposed between the coil unit and the shield unit; and a channel provided inside or adjacent to the magnetic unit, and a fluid for cooling is introduced into the channel and comes into contact with the magnetic unit.

Advantageous Effects of Invention

The wireless charging device according to the embodiment comprises a channel provided inside or adjacent to the magnetic unit, and a fluid for cooling is introduced into the channel and comes into contact with the magnetic unit, whereby heat generated during wireless charging can be readily discharged.

Accordingly, the wireless charging device can be advantageously used in electric vehicles that require large-capacity power transmission between a transmitter and a receiver.

<Explanation of Reference Numerals>

| | |
|---|---|
| 1: transportation means (electric vehicle) | |
| 2: injection molding machine | 3: mold |
| 15: cooler | 16: connection channel |
| 21: receiver | 22: transmitter |
| 100, 100', 200, 300, 400, 500, 600: wireless charging device | |
| 110, 110', 210, 310, 410, 510, 610: coil unit | |
| 120, 120', 220, 320, 420, 420a, 420b, 420c, 520, 620: magnetic unit | |
| 130, 130', 230, 330, 430, 530, 630: shield unit | |
| 140, 140', 240, 340, 440, 540: air circulation unit | |
| 145, 245, 345, 445, 555: air (fluid) | |
| 160, 560, 660: support unit | |
| 270, 370, 470: inlet pipe | 280, 380, 480: outlet pipe |
| 390: guide wall | |
| 490: hole | 495a, 495b, 495c: cooling channel |
| 501, 601: housing | 621: raw material composition |
| 640: heat dissipation unit | 695: microchannel |
| 670: inlet | 680: outlet |

BEST MODE FOR CARRYING OUT THE INVENTION

In the following description of the embodiments, in the case where an element is mentioned to be formed "on" or "under" another element, it means not only that one element is directly formed "on" or "under" another element, but also that one element is indirectly formed on or under another element with other element(s) interposed between them.

In addition, the term on or under with respect to each element may be referenced to the drawings. For the sake of description, the sizes of individual elements in the appended drawings may be exaggeratedly depicted, and they may differ from the actual sizes.

Throughout the present specification, when a part is referred to as "comprising" an element, it is understood that other elements may be comprised, rather than other elements are excluded, unless specifically stated otherwise.

In addition, all numbers expressing the physical properties, dimensions, and the like of elements used herein are to be understood as being modified by the term "about" unless otherwise indicated.

In the present specification, a singular expression is understood to encompass a singular or plural expression, interpreted in context, unless otherwise specified.

Wireless Charging Device

The wireless charging device according to an embodiment comprises a coil unit; a shield unit disposed on the coil unit; a magnetic unit disposed between the coil unit and the shield unit; and a channel provided inside or adjacent to the magnetic unit, wherein a fluid for cooling is introduced into the channel and comes into contact with the magnetic unit.

As an example, the wireless charging device may comprise, as the channel, an air circulation unit positioned between the magnetic unit and the shield unit. Air, as the cooling fluid, may be introduced into the air circulation unit and come into direct contact with the surface of the magnetic unit.

Figure 1A:
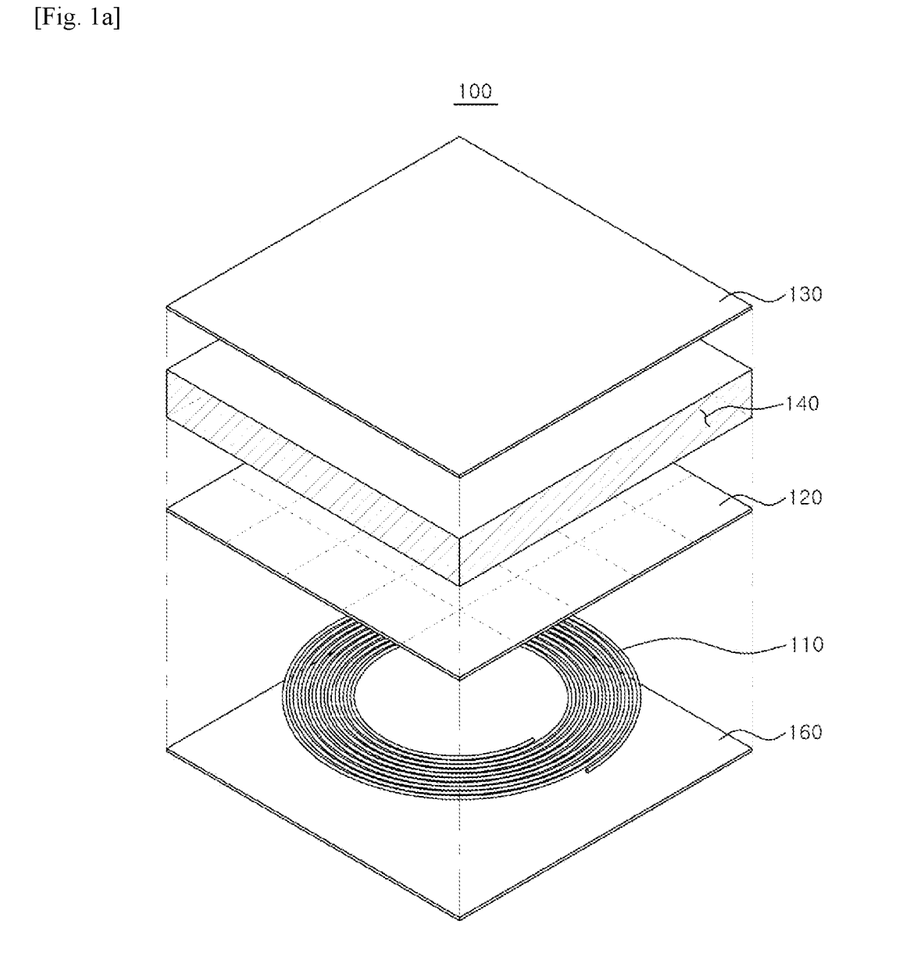
FIG. 1a is an exploded perspective view of a wireless charging device according to an embodiment.
Figure 1B:
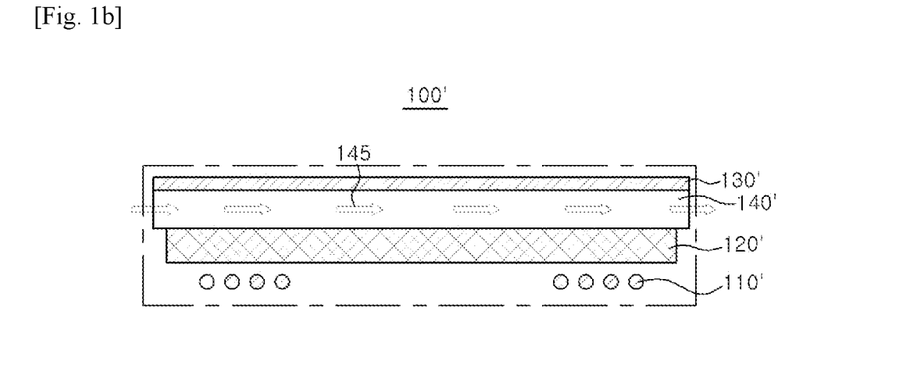
FIG. 1b is a cross-sectional view of a wireless charging device according to an embodiment.

Referring to FIGS. 1a and 1b, the wireless charging device (100, 100') comprises a coil unit (110, 110') comprising a conductive wire; a magnetic unit (120, 120') disposed on one side of the coil unit (110, 110'); a shield unit (130, 130') formed to be spaced apart from the magnetic unit (120, 120'); and an air circulation unit (140, 140') positioned between the magnetic unit (120, 120') and the shield unit (130, 130'), wherein air (145) introduced into the air circulation unit (140, 140') comes into direct contact with the surface of the magnetic unit (120, 120'). The air introduced into the air circulation unit (140, 140') may be air supplied from an external air conditioning system.

The air conditioning system may comprise a heating, ventilation, and cooling system of a vehicle. Specifically, it may comprise an automobile air conditioner.

As the wireless charging device according to an embodiment comprises an air circulation unit through which air introduced from the outside can circulate and come into direct contact with the surface of the magnetic unit, it is possible to circulate and discharge the heat generated in the magnetic unit to the outside and to enhance the heat dissipation characteristics and charging efficiency at the same time. In addition, since the air introduced into the air circulation unit is supplied from an external air conditioning system, it is possible to solve the problem of degradation of the magnetic unit due to moisture.

Figure 5:
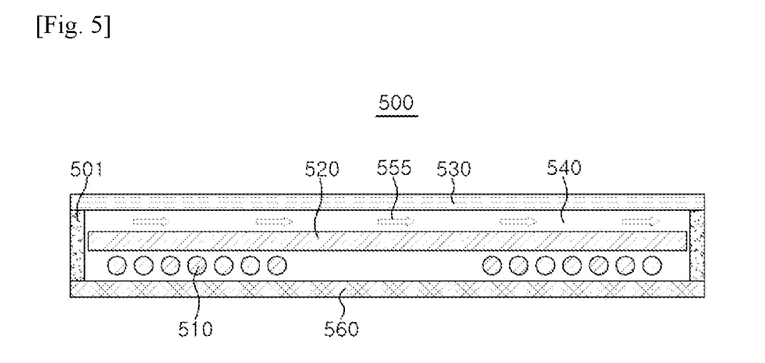
FIG. 5 is a cross-sectional view of a wireless charging device according to still another embodiment.

In addition, referring to FIG. 5, the wireless charging device may further comprise a support unit (560) for supporting the coil unit (510) and a housing (501) for accommodating the components.

As another example, the wireless charging device may comprise, as the channel, a microchannel provided inside the magnetic unit.

Figure 6:
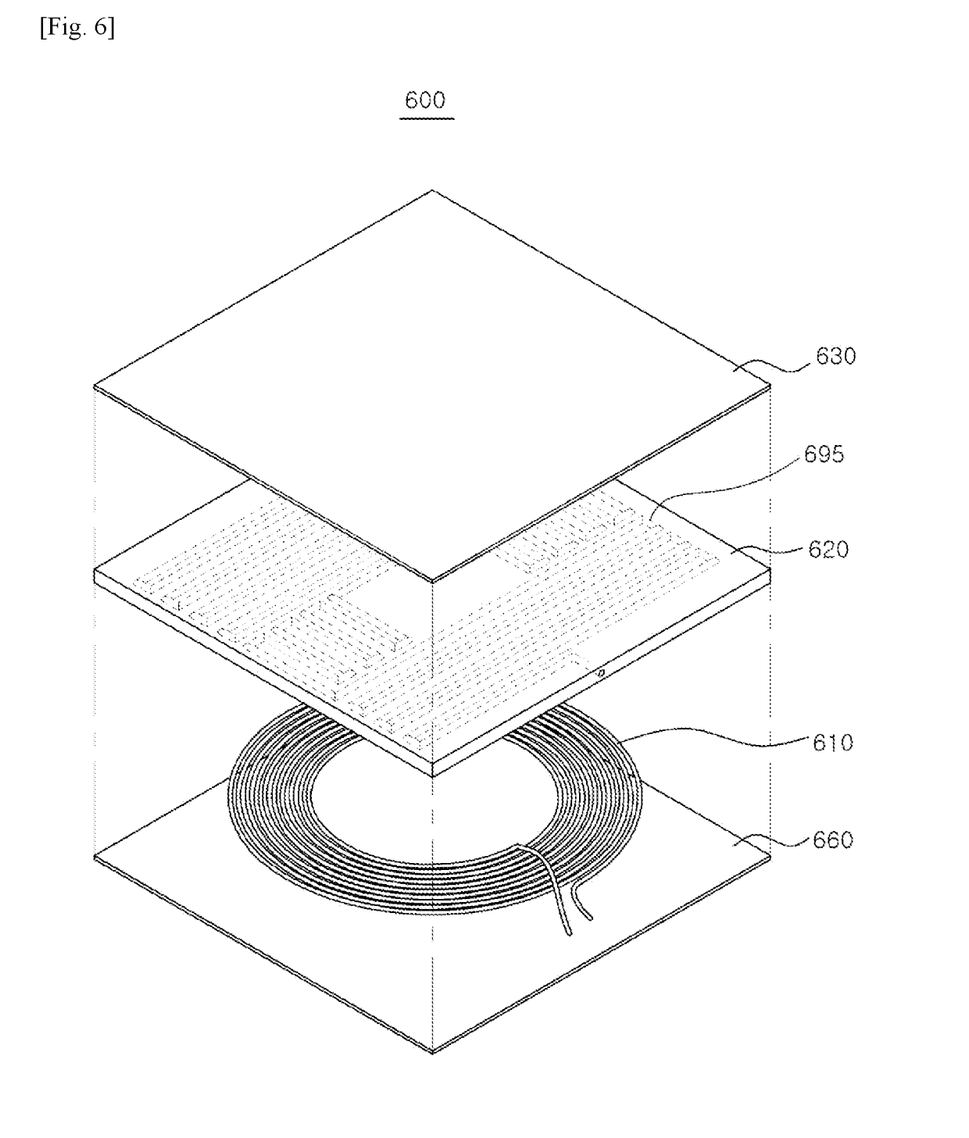
FIG. 6 is an exploded perspective view of a wireless charging device according to still another embodiment.

Referring to FIG. 6, the wireless charging device (600) according to an embodiment comprises a coil unit (610) comprising a conductive wire; a shield unit (630) disposed on the coil unit (610); a magnetic unit (620) disposed between the coil unit (610) and the shield unit (630); and a microchannel (695) provided inside or adjacent to the magnetic unit (620).

As the wireless charging device according to an embodiment comprises a channel provided inside or adjacent to the magnetic unit, heat can be readily discharged through a refrigerant. Specifically, as a microchannel is formed inside the magnetic unit, and as a gaseous or liquid fluid as a refrigerant is connected to an external cooler to be circulated, heat generated in the magnetic unit can be readily discharged to the outside.

Hereinafter, each constitutional element of the wireless charging device will be described in detail.

Coil Unit

The coil unit may comprise a conductive wire.

The conductive wire comprises a conductive material. For example, the conductive wire may comprise a conductive metal. Specifically, the conductive wire may comprise at least one metal selected from the group consisting of copper, nickel, gold, silver, zinc, and tin.

In addition, the conductive wire may have an insulating sheath. For example, the insulating sheath may comprise an insulating polymer resin. Specifically, the insulating sheath may comprise a polyvinyl chloride (PVC) resin, a polyethylene (PE) resin, a Teflon resin, a silicone resin, a polyurethane resin, or the like.

The conductive wire may have a diameter of, for example, 1 mm to 10 mm, 1 mm to 5 mm, or 1 mm to 3 mm.

The conductive wire may be wound in the form of a planar coil. Specifically, the planar coil may comprise a planar spiral coil. In addition, the planar shape of the coil may be a circle, an ellipse, a polygon, or a polygonal shape with rounded corners, but it is not particularly limited thereto.

The planar coil may have an outer diameter of 5 cm to 100 cm, 10 cm to 50 cm, 10 cm to 30 cm, 20 cm to 80 cm, or 50 cm to 100 cm. As a specific example, the planar coil may have an outer diameter of 10 cm to 50 cm.

In addition, the planar coil may have an inner diameter of 0.5 cm to 30 cm, 1 cm to 20 cm, or 2 cm to 15 cm.

The number of turns of the planar coil may be 5 to 50 times, 10 to 30 times, 5 to 30 times, 15 to 50 times, or 20 to 50 times. As a specific example, the planar coil may be formed by winding the conductive wire 10 to 30 times.

In addition, the distance between the conductive wires in the planar coil shape may be 0.1 cm to 1 cm, 0.1 cm to 0.5 cm, or 0.5 cm to 1 cm.

Within the preferred dimensions and specification ranges of the plane coil as described above, it can be appropriately used in the fields such as electric vehicles that require large-capacity power transmission.

The coil unit may be disposed to be spaced apart from the magnetic unit by a predetermined interval. For example, the spaced distance between the coil unit and the magnetic unit may be 0.2 mm or more, 0.5 mm or more, 0.2 mm to 3 mm, or 0.5 mm to 1.2 mm.

Shield Unit

The shield unit is disposed on the coil and the magnetic unit.

The shield unit suppresses electromagnetic interference (EMI) that may be generated by leakage of electromagnetic waves to the outside through electromagnetic shielding.

The shield unit may be disposed to be spaced apart from the coil unit by a predetermined interval. For example, the spaced distance between the shield unit and the coil unit may be 10 mm or more or 15 mm or more, specifically, 10 mm to 30 mm or 10 mm to 20 mm.

In addition, the shield unit may be disposed to be spaced apart from the magnetic unit by a predetermined interval. For example, the spaced distance between the shield unit and the magnetic unit may be 3 mm or more, 5 mm or more, 3 mm to 10 mm, or 4 mm to 7 mm.

The material of the shield unit may be, for example, a metal. Thus, the shield unit may be a metal plate, but it is not particularly limited thereto. As a specific example, the material of the shield unit may be aluminum. Other metals or alloy materials having an electromagnetic wave shielding ability may be used.

The shield unit may have a thickness of 0.2 mm to 10 mm, 0.5 mm to 5 mm, or 1 mm to 3 mm. In addition, the shield unit may have an area of 200 cm$^2$ or more, 400 cm$^2$ or more, or 600 cm$^2$ or more.

Magnetic Unit

The magnetic unit is disposed between the coil unit and the shield unit.

The magnetic unit may be disposed to be spaced apart from the coil unit by a predetermined interval. For example, the spaced distance between the magnetic unit and the coil unit may be 0.2 mm or more, 0.5 mm or more, 0.2 mm to 3 mm, or 0.5 mm to 1.5 mm.

The magnetic unit may be a polymer-type magnetic material comprising a binder resin and a magnetic powder. Alternatively, the magnetic unit may be a ferrite-based magnetic material, for example, a sintered ferrite-based magnetic material. Alternatively, the magnetic unit may comprise a metallic magnetic material, for example, a nanocrystalline magnetic material. Alternatively, the magnetic unit may be a composite material of two or more of the polymer-type magnetic material, the ferrite-based magnetic material, and the nanocrystalline magnetic material.

Polymer-Type Magnetic Material

The magnetic unit may comprise a magnetic powder and a binder resin.

Specifically, the magnetic unit may comprise a binder resin and a magnetic powder dispersed in the binder resin. As a result, since the magnetic powder is coupled with each other by the binder resin, the magnetic unit may have fewer defects over a large area and less damage caused by an impact.

The magnetic powder may be an oxide-based magnetic powder, a metal-based magnetic powder, or a mixed powder thereof. For example, the oxide-based magnetic powder may be a ferrite-based powder, specifically, a Ni—Zn-based, Mg—Zn-based, or Mn—Zn-based ferrite powder. In addition, the metal-based magnetic powder may be a Fe—Si—Al alloy magnetic powder or a Ni—Fe alloy magnetic powder, more specifically, a sendust powder or a permalloy powder.

As an example, the magnetic powder may have a composition of the following Formula 1.

$$Fe_{1-a-b-c}Si_aX_bY_c \qquad \text{[Formula 1]}$$

In the above formula, X is Al, Cr, Ni, Cu, or a combination thereof; Y is Mn, B, Co, Mo, or a combination thereof; $0.01 \leq a \leq 0.2$, $0.01 \leq b \leq 0.1$, and $0 \leq c \leq 0.05$.

In addition, the magnetic powder may be a nanocrystalline magnetic powder. For example, it may be a Fe-based nanocrystalline magnetic powder. Specifically, it may be a Fe—Si—Al-based nanocrystalline magnetic powder, a Fe—Si—Cr-based nanocrystalline magnetic powder, or a Fe—Si—B—Cu—Nb-based nanocrystalline magnetic powder.

The magnetic powder may have an average particle diameter in the range of about 3 nm to 1 mm, about 1 μm to 300 μm, about 1 μm to 50 μm, or about 1 μm to 10 μm.

The magnetic unit may comprise the magnetic powder in an amount of 10% by weight or more, 50% by weight or more, 70% by weight or more, or 85% by weight or more.

For example, the magnetic unit may comprise the magnetic powder in an amount of 10% by weight to 99% by weight, 10% by weight to 95% by weight, 50% by weight to 95% by weight, 50% by weight to 92% by weight, 70% by weight to 95% by weight, 80% by weight to 95% by weight, or 80% by weight to 90% by weight.

Examples of the binder resin include a polyimide resin, a polyamide resin, a polycarbonate resin, an acrylonitrile-butadiene-styrene (ABS) resin, a polypropylene resin, a polyethylene resin, a polystyrene resin, a polyphenylene sulfide (PPS) resin, a polyether ether ketone (PEEK) resin, a silicone resin, an acrylic resin, a polyurethane resin, a polyester resin, an isocyanate resin, and an epoxy resin, but it is not limited thereto.

For example, the binder resin may be a curable resin. Specifically, the binder resin may be a photocurable resin and/or a thermosetting resin. In particular, it may be a resin capable of exhibiting adhesiveness upon curing. More specifically, the binder resin may be a resin comprising at least one functional group or moiety that can be cured by heat such as a glycidyl group, an isocyanate group, a hydroxyl group, a carboxyl group, or an amide group; or at least one functional group or moiety that can be cured by active energy such as an epoxide group, a cyclic ether group, a sulfide group, an acetal group, or a lactone group. Such a functional group or moiety may be, for example, an isocyanate group (—NCO), a hydroxyl group (—OH), or a carboxyl group (—COOH).

Alternatively, the binder resin may be a thermoplastic resin. Specifically, it may be a high heat-resistant thermoplastic resin.

The magnetic unit may comprise the binder resin in an amount of 5% by weight to 40% by weight, 5% by weight to 20% by weight, 5% by weight to 15% by weight, or 7% by weight to 15% by weight.

In addition, the magnetic unit may comprise, based on the weight thereof, 6% by weight to 12% by weight of a polyurethane-based resin, 0.5% by weight to 2% by weight of an isocyanate-based curing agent, and 0.3% by weight to 1.5% by weight of an epoxy-based resin, as the binder resin.

The magnetic unit may be a magnetic block prepared by a method such as molding through a mold. For example, the magnetic unit may be one molded into a three-dimensional structure through a mold. Such a magnetic block may be obtained by mixing a magnetic powder and a binder resin and injecting it into a mold by injection molding to be molded to a three-dimensional structure.

Figure 7A:
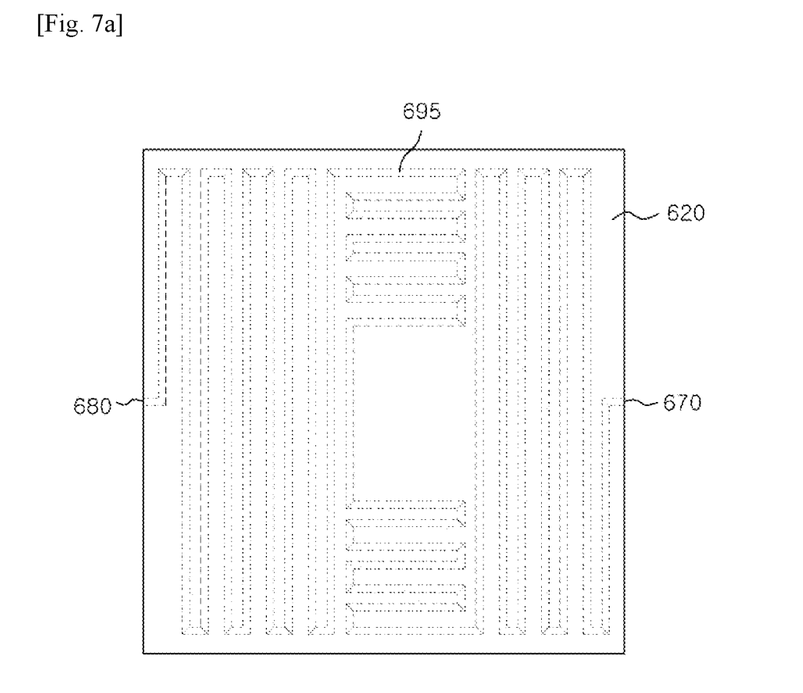
FIG. 7a is a plan view of a magnetic unit comprising microchannels therein.
Figure 7B:
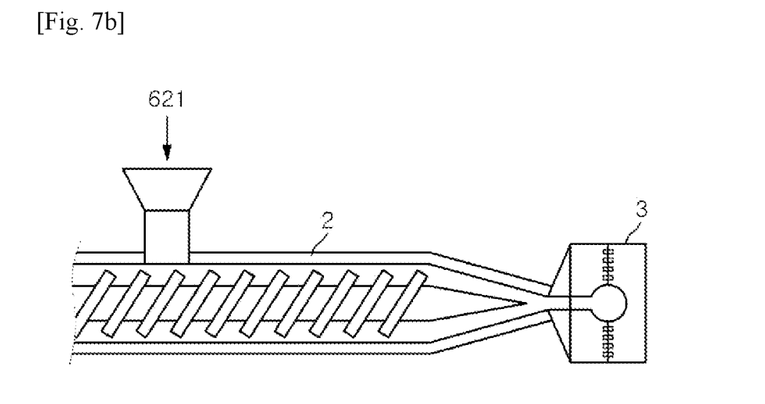
FIG. 7b illustrates a process of forming a magnetic unit through a mold.

Specifically, the molding may be carried out by injecting the raw materials for the magnetic unit into a mold by injection molding. More specifically, the magnetic unit may be prepared by mixing a magnetic powder and a polymer resin composition to obtain a raw material composition, and then injecting the raw material composition (621) into a mold (3) by an injection molding machine (2) as shown in FIG. 7b. In such an event, the internal shape of the mold (3) may be designed as a three-dimensional structure, so that the three-dimensional structure of the magnetic unit may be easily achieved. Such a process may be hardly carried out in which a conventional sintered ferrite sheet is used as a magnetic unit.

Ferrite-Based Magnetic Material

The ferrite-based magnetic material may comprise, for example, an oxide represented by $MOFe_2O_3$ (wherein M is one or more divalent metal elements such as Mn, Zn, Cu, and Ni). The ferrite-based magnetic material is preferably a sintered one from the viewpoint of such magnetic characteristics as magnetic permeability. The ferrite-based magnetic material may be prepared in the form of a sheet or a block by mixing raw materials, followed by calcining, pulverizing, mixing with a binder resin, molding, and sintering.

More specifically, the ferrite-based magnetic material may be a Ni—Zn-based, Mg—Zn-based, or Mn—Zn-based ferrite. In particular, Mn—Zn-based ferrite may exhibit high magnetic permeability, low magnetic permeability loss, and high saturation magnetic flux density over a temperature range of room temperature to 100° C. or higher at a frequency of 85 kHz.

The Mn—Zn-based ferrite comprises 66% by mole to 70% by mole of $Fe_2O_3$, 10% by mole to 20% by mole of ZnO, 8% by mole to 24% by mole of MnO, and 0.4% by mole to 2% by mole of NiO as main components and may further comprise $SiO_2$, CaO, $Nb_2O_5$, $ZrO_2$, SnO, and the like as additional subcomponents. The Mn—Zn-based ferrite may be prepared in the form of a sheet or a block by mixing the main components at predetermined molar ratios, calcining them in the air at a temperature of 800° C. to 1,100° C. for 1 hour to 3 hours, adding the subcomponents thereto and pulverizing them, mixing them with a binder resin such as polyvinyl alcohol (PVA) in an appropriate amount, press-molding them using a press, and sintering them by raising the temperature to 1,200° C. to 1,300° C. for 2 hours or longer. Thereafter, it is processed using a wire saw or a water jet and cut to a required size, if necessary.

Nanocrystalline Magnetic Material

The magnetic unit may comprise a nanocrystalline magnetic material. If the nanocrystalline magnetic material is applied as the magnetic unit, the longer the distance from the coil unit, the lower the resistance (Rs) even if the inductance (Ls) of the coil is lowered. Thus, the quality factor (Q factor: Ls/Rs) of the coil is increased, which may enhance the charging efficiency and reduce the generation of heat.

For example, the magnetic unit may be a Fe-based nanocrystalline magnetic material. Specifically, it may be a Fe—Si—Al-based nanocrystalline magnetic material, a Fe—Si—Cr-based nanocrystalline magnetic material, or a Fe—Si—B—Cu—Nb-based nanocrystalline magnetic material.

More specifically, the magnetic unit may be a Fe—Si—B—Cu—Nb-based nanocrystalline magnetic material. In such a case, it is preferable that Fe is 70% by element to 85% by element, the sum of Si and B is 10% by element to 29% by element, and the sum of Cu and Nb is 1% by element to 5% by element (wherein % by element refers to the percentage of the number of specific elements to the total number of elements constituting the magnetic unit). Within the above composition ranges, a Fe—Si—B—Cu—Nb-based alloy can be easily formed into a nanocrystalline magnetic material by thermal treatment.

The nanocrystalline magnetic material is prepared by, for example, a rapid solidification process (RSP) by melt-spinning a Fe-based alloy. It may be prepared by performing a zero-field thermal treatment for 30 minutes to 2 hours in a temperature range of 300° C. to 700° C.

If the thermal treatment temperature is lower than 300° C., nanocrystals are not sufficiently formed, so that the desired magnetic permeability is not obtained, which requires a longer thermal treatment time. If it exceeds 700° C., the magnetic permeability may be significantly lowered by excessive thermal treatment. In addition, when the thermal treatment temperature is low, the treatment time is long. On the other hand, when the thermal treatment temperature is high, the treatment time is preferably shortened.

The nanocrystalline magnetic material may have a thickness of 15 μm to 150 μm. Meanwhile, it is difficult to make the nanocrystalline magnetic material thick due to the features of the preparation process. For example, it may be formed into a thin sheet having a thickness of 15 μm to 35

µm. Thus, a plurality of such thin film sheets may be laminated to form a magnetic unit. In such an event, an adhesive layer such as an adhesive tape may be interposed between the thin sheets.

In addition, the nanocrystalline magnetic material may be crushed by a pressure roll or the like at the end of the manufacturing process to form a plurality of cracks in the thin sheet, whereby it may be manufactured to comprise a plurality of nanocrystalline fine pieces.

The nanocrystalline magnetic material may have magnetic characteristics in a specific range in the vicinity of a standard frequency for wireless charging of an electric vehicle.

For example, the nanocrystalline magnetic material may have a magnetic permeability of 500 to 150,000 and a magnetic permeability loss of 100 to 50,000 at a frequency of 85 kHz. As an example, when the magnetic unit comprises a crushed nanocrystalline magnetic material, it may have a magnetic permeability of 500 to 3,000 and a magnetic permeability loss of 100 to 1,000 at a frequency of 85 kHz. As another example, when the magnetic unit comprises a non-crushed nanocrystalline magnetic material, it may have a magnetic permeability of 10,000 to 150,000 and a magnetic permeability loss of 1,000 to 10,000 at a frequency of 85 kHz.

Area and Thickness of the Magnetic Unit

The magnetic unit may have a structure of a magnetic sheet, a magnetic sheet laminate, or a magnetic block.

The magnetic unit may have a large area. Specifically, it may have an area of 200 cm$^2$ or more, 400 cm$^2$ or more, or 600 cm$^2$ or more. In addition, the magnetic unit may have an area of 10,000 cm$^2$ or less.

The magnetic unit of a large area may be configured by combining a plurality of unit magnetic materials. In such an event, the area of the individual unit magnetic materials may be 60 cm$^2$ or more, 90 cm$^2$, or 95 cm$^2$ to 900 cm$^2$.

The magnetic sheet may have a thickness of 15 µm or more, 50 µm or more, 80 µm or more, 15 µm to 150 µm, 15 µm to 35 µm, or 85 µm to 150 µm. Such a magnetic sheet may be prepared by a method of preparing a conventional film or sheet.

The magnetic sheet laminate may be one in which 20 or more or 50 or more magnetic sheets are laminated. In addition, the magnetic sheet laminate may be one in which 150 or fewer or 100 or fewer magnetic sheets are laminated.

The magnetic block may have a thickness of 1 mm or more, 2 mm or more, 3 mm or more, or 4 mm or more. In addition, the magnetic block may have a thickness of 6 mm or less.

The magnetic block may be prepared by a method such as injection molding.

Magnetic Characteristics of the Magnetic Unit

The magnetic unit may have magnetic characteristics in a certain range in the vicinity of a standard frequency for wireless charging of an electric vehicle.

The standard frequency for wireless charging of an electric vehicle may be less than 100 kHz, for example, 79 kHz to 90 kHz, specifically, 81 kHz to 90 kHz, more specifically, about 85 kHz. It is a band distinct from the frequency applied to mobile electronic devices such as cell phones.

The magnetic permeability of the magnetic unit at a frequency of 85 kHz may vary depending on the material. It may be 5 or more, for example, 5 to 150,000 and may specifically be in the range of 5 to 300, 500 to 3,500, or 10,000 to 150,000 depending on the specific material. In addition, the magnetic permeability loss of the magnetic unit at a frequency of 85 kHz may vary depending on the material. It may be 0 or more, for example, 0 to 50,000 and may specifically be 0 to 1,000, 1 to 100, 100 to 1,000, or 5,000 to 50,000 depending on the specific material.

As a specific example, when the magnetic unit is a polymer-type magnetic material comprising a magnetic powder and a binder resin, its magnetic permeability may be, for example, 5 to 130, 15 to 80, or 10 to 50, and its magnetic permeability loss may be 0 to 20, 0 to 15, or 0 to 5, at a frequency of 85 kHz.

Physical Properties of the Magnetic Unit

The magnetic unit may be elongated at a certain ratio. For example, the elongation of the magnetic unit may be 0.5% or more. The elongation characteristic is difficult to obtain in a ceramic-based magnetic material to which a polymer is not applied. It may reduce damage even if a large-area magnetic unit is distorted by an impact. Specifically, the elongation of the magnetic unit may be 0.5% or more, 1% or more, or 2.5% or more. There is no particular limitation to the upper limit of the elongation. However, if the content of the polymer resin is increased to enhance the elongation, such characteristics as inductance of the magnetic unit may be deteriorated. Thus, the elongation is preferably 10% or less.

The magnetic unit has a small rate of change in characteristics before and after an impact and is significantly superior to those of conventional ferrite magnetic sheets. In the present specification, the rate of change (%) in certain characteristics before and after an impact may be calculated by the following equation.

$$\text{Rate of change (\%) in characteristic} = |\text{characteristic value before impact} - \text{characteristic value after impact}|/\text{characteristic value before impact} \times 100$$

For example, when the magnetic unit is subjected to free-falling from a height of 1 m, it may have a rate of change in inductance of less than 5% or 3% or less before and after the impact. More specifically, the rate of change in inductance may be 0% to 3%, 0.001% to 2%, or 0.01% to 1.5%. Within the above range, since the rate of change in inductance before and after an impact is relatively small, the stability of the magnetic unit may be further enhanced.

In addition, when the magnetic unit is subjected to free-falling from a height of 1 m, it may have a rate of change in Q factor (Ls/Rs) of 0% to 5%, 0.001% to 4%, or 0.01% to 2.5%, before and after the impact. Within the above range, since the change in characteristics before and after an impact is small, the stability and impact resistance of the magnetic unit may be further enhanced.

In addition, when the magnetic unit is subjected to free-falling from a height of 1 m, it may have a rate of change in resistance of 0% to 2.8%, 0.001% to 1.8%, or 0.1% to 1.0%, before and after the impact. Within the above range, even if it is repeatedly applied in an environment where an actual impact and vibration are applied, the resistance value can be well maintained below a certain level.

In addition, when the magnetic unit is subjected to free-falling from a height of 1 m, it may have a rate of change in charging efficiency of 0% to 6.8%, 0.001% to 5.8%, or 0.01% to 3.4%, before and after the impact. Within the above range, even if a large-area magnetic unit is repeatedly subjected to an impact or distortion, its characteristics can be more stably maintained.

Air Circulation Unit

The wireless charging device may comprise an air circulation unit positioned between the magnetic unit and the shield unit.

In a typical wireless charging device, in order to prevent a problem of a sudden drop in the charging efficiency due to the generation of an anti-magnetic field, a shield unit is disposed to be spaced apart from the magnetic unit by a certain distance. As a result, an air circulation unit may be provided in the empty space between the magnetic unit and the shield unit. Air introduced into the air circulation unit from the outside comes into direct contact with the surface of the magnetic unit and is then discharged to the outside, whereby heat generated in the magnetic unit is circulated, thereby enhancing the heat dissipation characteristics and charging efficiency at the same time. In addition, since the air introduced into the air circulation unit is supplied from an external air conditioning system, it is possible to solve the problem of degradation of the magnetic unit due to moisture.

The air introduced into the air circulation unit may come into direct contact with the surface of the magnetic unit. In addition, the air introduced into the air circulation unit may come into direct contact with the surface of the shield unit. In addition, the air introduced into the air circulation unit may come into direct contact with both the surface of the magnetic unit and that of the shield unit.

The temperature inside the air circulation unit may be 5° C. to 50° C. For example, it may be 10° C. to 40° C., 10° C. to 30° C., 20° C. to 40° C., 10° C. to 25° C., or 15° C. to 30° C.

In addition, the humidity inside the air circulation unit may be 30% to 80%. For example, it may be 30% to 70%, 50% to 60%, 30% to 60%, or 40% to 65%. If the humidity inside the air circulation unit satisfies the above range, it is possible to not only enhance the heat dissipation characteristics, but also minimize the problem of deterioration of the magnetic unit that may be caused by high humidity.

As the wireless charging device according to an embodiment of the present invention comprises an air circulation unit in which air supplied from an external air conditioning system comes into direct contact with the surface of the magnetic unit and is circulated, it is possible to enhance the charging efficiency by 0.1% or more, specifically, 0.2% to 10%, more specifically, 0.5% to 5%, as compared with a wireless charging device that does not comprise such an air circulation unit. In addition, it is possible to prevent mechanical damage that may be caused to the adjacent circuits due to heat generated from the magnetic unit and the coil unit.

Application of the Air Circulation Unit

Figure 2:
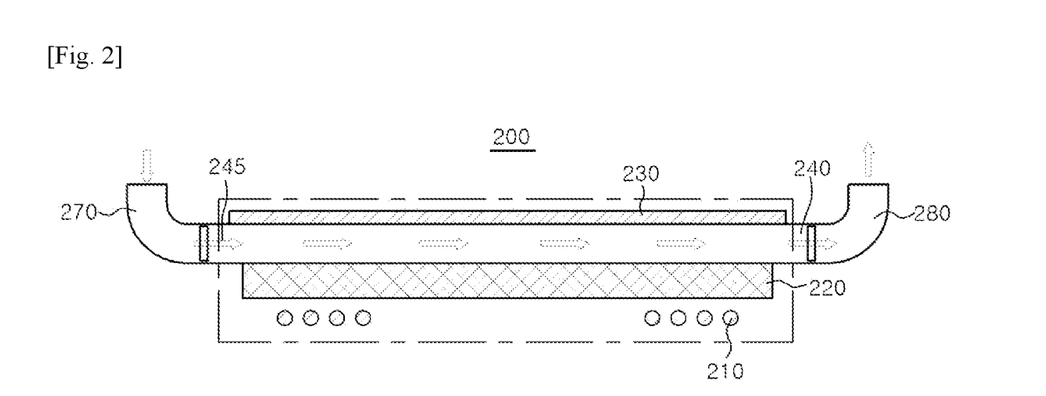
FIG. 2 is a cross-sectional view of a wireless charging device according to another embodiment.
Figure 3A:
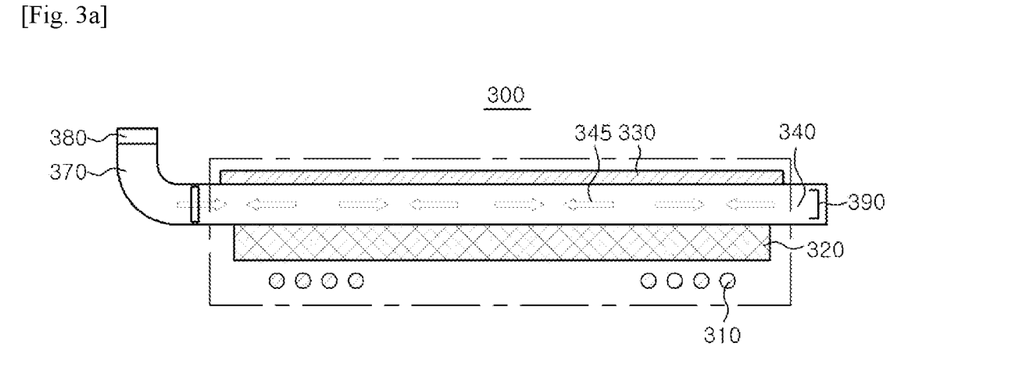
FIG. 3a is a cross-sectional view of a wireless charging device according to still another embodiment.
Figure 4A:
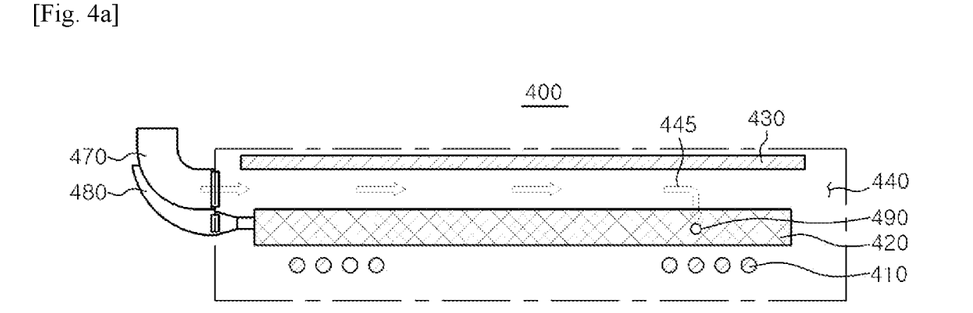
FIG. 4a is a cross-sectional view of a wireless charging device according to still another embodiment.

FIGS. 2, 3*a*, and 4*a* are each a cross-sectional view of various wireless charging devices (200, 300, 400) comprising the air circulation unit.

According to an example, as shown in FIG. 2, it may further comprise an inlet pipe (270) connected to allow air to be introduced into the air circulation unit (240) and an outlet pipe (280) connected to discharge air from the air circulation unit, both being disposed on one side or both sides of the air circulation unit (240).

Specifically, the wireless charging device (200) comprises a coil unit (210) comprising a conductive wire; a magnetic unit (220) disposed on one side of the coil unit (210); a shield unit (230) formed to be spaced apart from the magnetic unit (220); and an air circulation unit (240) positioned between the magnetic unit (220) and the shield unit (230) in which air is in direct contact with the surface of the magnetic unit (220), wherein it may further comprise an inlet pipe (270) connected to allow air to be introduced into the air circulation unit (240) and an outlet pipe (280) connected to discharge air from the air circulation unit, both being disposed on one side or both sides of the air circulation unit (240).

More specifically, the air circulation unit (240) is in contact with one side of the magnetic unit (220) in which air (245) supplied from an external air conditioning system may be introduced through the inlet pipe (270), and the air introduced may be circulated in the air circulation unit (240) to discharge the heat generated in the magnetic unit (220) to the outside through the outlet pipe (280). In such an event, the air introduced through the inlet pipe (270) may come into direct contact with the surface of the shield unit (230). In addition, if the air introduced through the inlet pipe (270) is in direct contact with both the surface of the shield unit (230) and that of the magnetic unit (220), the heat dissipation effect can be maximized. The size, shape, and material of the inlet pipe (270) and the outlet pipe (280) are not particularly limited as long as the effect of the present invention is not impaired.

Since a typical wireless charging device has a closed structure to prevent the inflow of humid air or dust, it is disadvantageous for dissipating the heat generated during wireless charging. In particular, if humid air or dust is introduced, it may cause deterioration of the magnetic unit.

However, as the inlet pipe is connected to an external air conditioning system, so that air is supplied from the air conditioning system through the inlet pipe and then circulated as described above, it is possible to discharge the heat generated in the magnetic unit to the outside. Further, since dry air with low humidity from the air conditioning system can be uniformly circulated on the surface of the magnetic unit, the problem of deterioration of the magnetic unit due to moisture in the prior art can be solved.

Figure 3B:
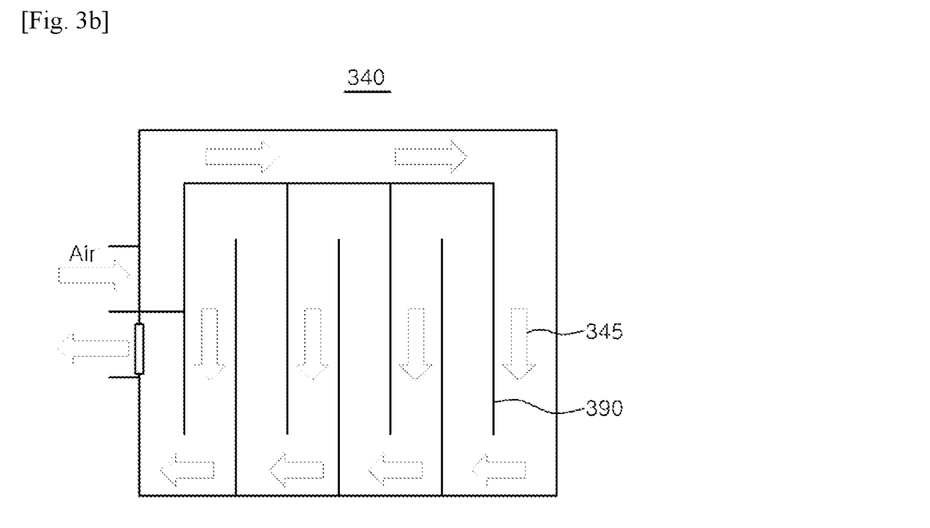
FIG. 3b is a plan view of an air circulation unit according to an embodiment.

Meanwhile, FIGS. 3*a* and 3*b* each show a cross-sectional view of a wireless charging device according to another embodiment and a plan view of an air circulation unit adopted in the wireless charging device.

Referring to FIGS. 3*a* and 3*b*, the wireless charging device (300) comprises an air circulation unit (340) positioned between the magnetic unit (320) and the shield unit (330) in which air (345) is in direct contact with the surface of the magnetic unit (320), wherein the air circulation unit (340) may further comprise a guide wall (390) formed to allow the air to flow.

If the guide wall (390) is positioned in contact with the surface of the magnetic unit (320), air may be allowed to be in uniform contact with the surface of the magnetic unit (320).

In addition, the guide wall (390) may be disposed to correspond to an area in which the coil unit (310) is present. In general, the coil unit has a high electromagnetic wave energy density, and heat may be thus accumulated the most, making the temperature the highest. Thus, the guide wall is disposed corresponding to the area where the coil unit is present, so that air circulates by the guide wall to discharge heat. In addition, the guide wall (390) may be disposed in the area where the coil unit (310) is present and the other areas as well.

In addition, the guide wall (390) may be fixed by a guide wall fixing member (not shown), and the magnetic unit may comprise the guide wall fixing member in a portion thereof. The position, shape, and size of the guide wall fixing member are not particularly limited as long as it can fix the guide wall (390).

Since the magnetic unit can be molded into a desired three-dimensional structure by a mold, the guide wall fixing member may be provided at a desired position without limitation on a lateral side or an upper side thereof when the magnetic unit is molded. The guide wall may be fixed in the wireless charging device by being fixed by the guide wall fixing member, specifically, without falling off from the magnetic unit. Alternatively, the guide wall may be fixed to the magnetic unit using an adhesive.

In addition, the guide wall may be made of a heat-resistant plastic material. Specifically, it may comprise at least one selected from the group consisting of polypropylene, acrylonitrile-butadiene-styrene copolymer (ABS), polycarbonate, polyamide, polyimide, polybutylene terephthalate, polyphenylene sulfide, and polyether ether ketone. The thickness and width of the guide wall are not particularly limited. For example, its thickness may be 1 mm to 3 mm, 1 mm to 2.5 mm, 1.5 mm to 3 mm, 1.5 mm to 2.5 mm, or 2 mm to 3 mm, and its width may be 0.1 mm to 6 mm, 0.1 mm to 5 mm, 0.1 mm to 3 mm, 0.5 mm to 4 mm, or 0.3 mm to 4 mm.

The total length of the movement path of air by the guide wall may be 25% to 500%, specifically, 50% to 400%, more specifically, 75% to 300%, based on the circumference of the magnetic unit. If the total length of the movement path of air satisfies the above range, the air may circulate uniformly on the surface of the magnetic unit, whereby the heat dissipation characteristics may be further enhanced.

Figure 4B:
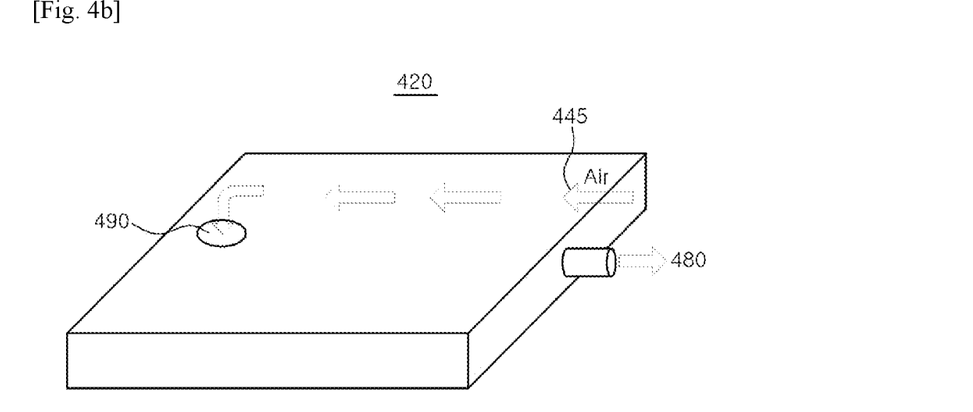
FIGS. 4b and 4c are each a perspective view and a plan view of a magnetic unit according to an embodiment.
Figure 4C:
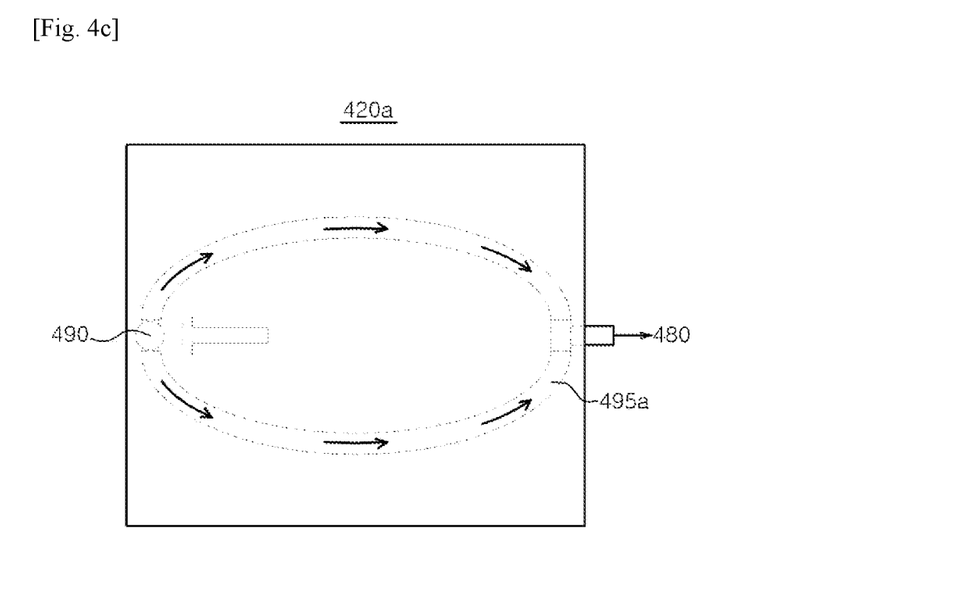
Figure 4D:
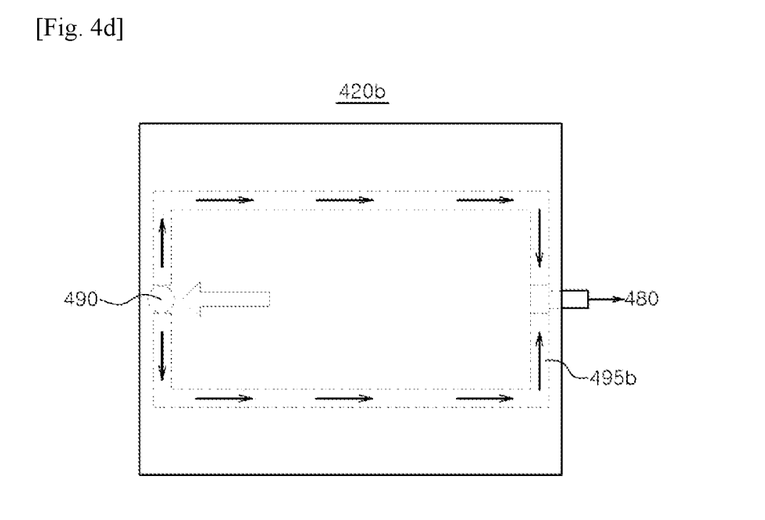
FIG. 4d is a plan view of a magnetic unit according to another embodiment.
Figure 4E:
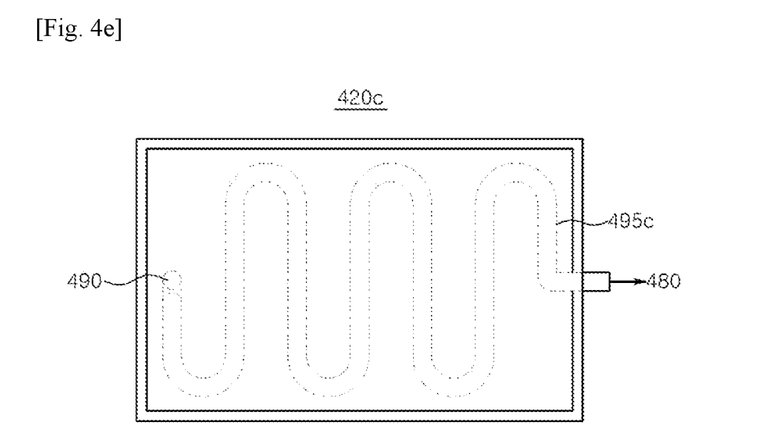
FIG. 4e is a plan view of a magnetic unit according to still another embodiment.

Meanwhile, FIG. 4a is a cross-sectional view of a wireless charging device according to still another embodiment of the present invention. FIG. 4b is a perspective view of a magnetic unit in various shapes adopted in the wireless charging device. FIGS. 4c to 4e are each a plan view of a magnetic unit in various shapes adopted in the wireless charging device for illustrating the inside thereof.

Referring to FIGS. 4a to 4e, in the wireless charging device (400), the magnetic unit (420, 420a, 420b, 420c) may further comprise at least one hole (490) through which air is introduced from the air circulation unit (440) and a cooling channel (495a, 495b, 495c) provided in the magnetic unit (420, 420a, 420b, 420c) and connected to the hole (490) to circulate air (445).

Since the magnetic unit (420, 420a, 420b, 420c) can be molded into a three-dimensional structure by a mold, the hole (490) and the cooling channel (495a, 495b, 495c) may be provided inside the magnetic unit when the magnetic unit is molded. In addition, the wireless charging device (400) may further comprise an inlet pipe (470) disposed on one side of the air circulation unit (440) and connected to allow air to be introduced into the air circulation unit (440) and an outlet pipe (480) disposed on one side of the magnetic unit (420) and connected to discharge air from the cooling channel (495a, 495b, 495c).

FIG. 4b shows a magnetic unit (420) comprising a hole (490) present inside the magnetic unit (420) and an outlet pipe (480) disposed on one side of the magnetic unit (420) and connected to discharge air. As air (445) introduced from the inlet pipe (470) passes through the inside of the magnetic unit (420) via the hole (490), the heat dissipation effect can be maximized.

In addition, FIGS. 4c to 4e each show various shapes of a cooling channel (495a, 495b, 495c) positioned inside the magnetic unit (420a, 420b, 420c) and connected to the hole (490) to circulate air. In addition, the outlet pipe (480) may be connected to the cooling channel (495a, 495b, 495c) positioned inside the magnetic unit.

The shape of the cooling channel is not limited as long as it does not impair the effects of the present invention. For example, it may comprise a curved channel, a straight channel, or a meandering channel.

Specifically, as shown in FIG. 4c, the cooling channel (495a) may be a curved channel. In addition, as shown in FIG. 4d, the cooling channel (495b) may be a straight channel. In addition, as shown in FIG. 4e, the cooling channel (495c) may be a meandering channel.

The hole (490) may have a diameter of 0.5 mm to 4.5 mm, specifically, 1 mm to 3 mm, more specifically, 1.5 mm to 2.5 mm.

In addition, the cooling channel (495a, 495b, 495c) may have a diameter of 0.5 mm to 4.5 mm, specifically, 1 mm to 3 mm, more specifically, 1.5 mm to 2.5 mm. In addition, the diameter of the cooling channel and that of the hole may be the same as, or different from, each other. If the diameter of the cooling channel exceeds the above range, the charging efficiency may be reduced. If the diameter of the cooling channel is less than the above range, the region in which air introduced from the outside circulates through the cooling channel may be narrowed, so that the heat dissipation characteristics may be reduced.

The cooling channel (495a, 495b, 495c) may have a total internal volume of 1% to 40%, specifically, 3% to 30%, more specifically, 5% to 20%, of the total volume of the magnetic unit.

The cooling channel is disposed to correspond to a region in which the coil unit is present, so that heat of the coil unit, in which a lot of heat is accumulated due to a high electromagnetic wave energy density, is discharged to the outside by the cooling channel, whereby the heat dissipation effect can be maximized. In addition, the cooling channel may be disposed in an area where the coil unit is present and the other areas as well.

Microchannel

As shown in FIG. 6, the wireless charging device (600) according to an embodiment may comprise a microchannel (695) provided inside or adjacent to the magnetic unit (620). As a result, heat generated in the magnetic unit (620) may be effectively discharged to the outside.

The shape of the microchannel is not particularly limited as long as it is a shape for readily transferring heat of the magnetic unit to the outside by a fluid. FIG. 7a is a plan view of a magnetic unit comprising a microchannel therein. As shown in FIG. 7a, the microchannel (695) may be designed such that the fluid injected into an inlet (670) circulates over a large area and is then discharged through an outlet (680).

Meanwhile, since the region in which heat is primarily generated in the magnetic unit is a region corresponding to the coil unit, the microchannel may be disposed to correspond to a region in which the coil unit is present. In other words, the microchannel may hardly be disposed in a central region where the density of the conductive wire is low in the coil unit.

The microchannel may have an internal diameter of 0.1 mm to 5 mm. Within the above range, it is possible to further increase the heat dissipation characteristics through the smooth flow of a fluid while the magnetic properties per volume of the magnetic material are maintained. More specifically, the internal diameter of the microchannel may be 0.5 mm to 3 mm, 0.5 mm to 2 mm, 2 mm to 5 mm.

As shown in FIG. 7a, the microchannel (695) may be disposed inside the magnetic unit (620). In such a case, there is an advantage in that heat generated inside the magnetic unit can be effectively dealt with. The structure in which the microchannel is disposed inside the magnetic unit may be designed in various ways.

As an example, a polymer-type magnetic material may be molded through a mold to have a microchannel therein. In such a case, the microchannel may be defined as an empty space inside the magnetic unit.

As another example, once a polymer-type magnetic material has been molded through a mold to have an inner space to which a microchannel is to be inserted, the microchannel may be inserted thereto. In such a case, the microchannel may be pre-fabricated with a metal or other thermally conductive materials and then inserted into the polymer-type magnetic material.

As still another example, a microchannel may be inserted between a plurality of magnetic sheets, which are then stacked to prepare a magnetic sheet laminate in which the microchannel is inserted thereto.

The microchannel may have a total internal volume of 5% to 70% based on the total volume of the magnetic unit. Within the above range, it may be more advantageous for simultaneously enhancing the electromagnetic wave shielding performance and heat dissipation characteristics of the magnetic unit. More specifically, the microchannel may have a total internal volume of 5% to 40%, 20% to 50%, or 40% to 70%, based on the total volume of the magnetic unit.

Figure 8A:
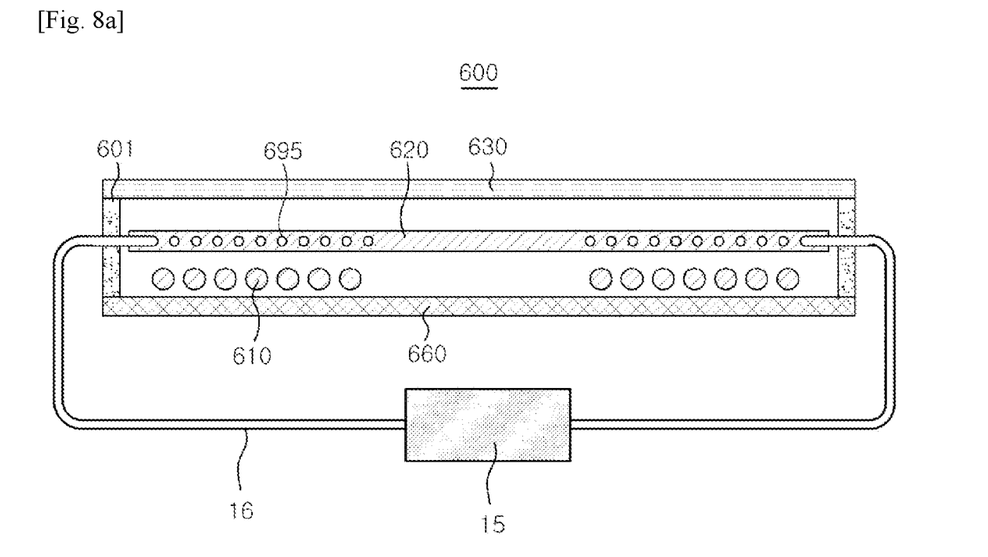
FIGS. 8a and 8b are each a cross-sectional view of a wireless charging device according to still another embodiment.
Figure 8B:
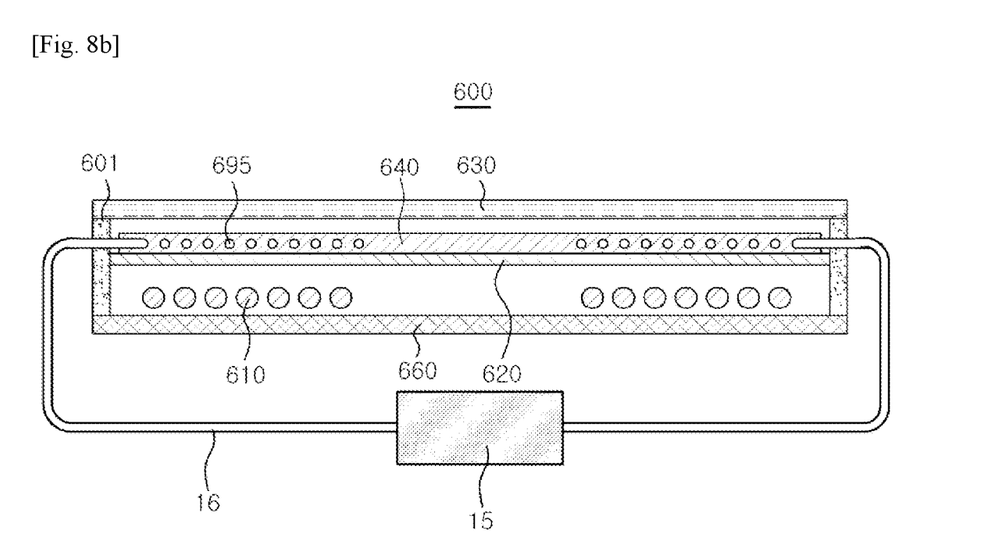

Alternatively, as shown in FIG. 8b, the microchannel (695) may be disposed adjacent to the magnetic unit (620). As an example, the microchannel (695) may be disposed between the magnetic unit (620) and the shield unit (630). Specifically, the microchannel (695) may be formed inside a heat dissipation unit (640), and the heat dissipation unit (640) may be disposed adjacent to the magnetic unit (620). For example, the heat dissipation unit (640) may be attached to one side of the magnetic unit (620). Specifically, the heat dissipation unit (640) may be attached to one side of the magnetic unit (620) facing the shield unit (630).

The heat dissipation unit may be composed of a thermally conductive material. The thermally conductive material may comprise a metal-based, carbon-based, ceramic-based material, or the like. In addition, the thermally conductive material may be a composite material in which a metal-based, carbon-based, or ceramic-based material is dispersed in a binder resin.

Alternatively, the microchannel may be disposed between the magnetic unit and the coil unit to deal with the heat generated in the magnetic unit and the coil unit at the same time.

Cooler and Circulation Pump

The wireless charging device may further comprise a cooler connected to the microchannel. FIGS. 8a and 8b, the wireless charging device (600) according to an embodiment may comprise a cooler (15) connected to the microchannel (695).

The cooler (15) may be disposed outside the housing (601) of the wireless charging device. The cooler may adopt a method and structure for effectively cooling the fluid. For example, the cooler may cool the fluid by air cooling or water cooling.

The cooler may be connected to the microchannel while it has a sealed structure for waterproofing and dustproofing. As shown in FIGS. 8a and 8b, the cooler (15) may be connected through a connection channel (16) to the inlet and outlet of the microchannel (695).

A cooling device commonly provided in the electric vehicle may be used as a cooler of the wireless charging device.

Figure 9:
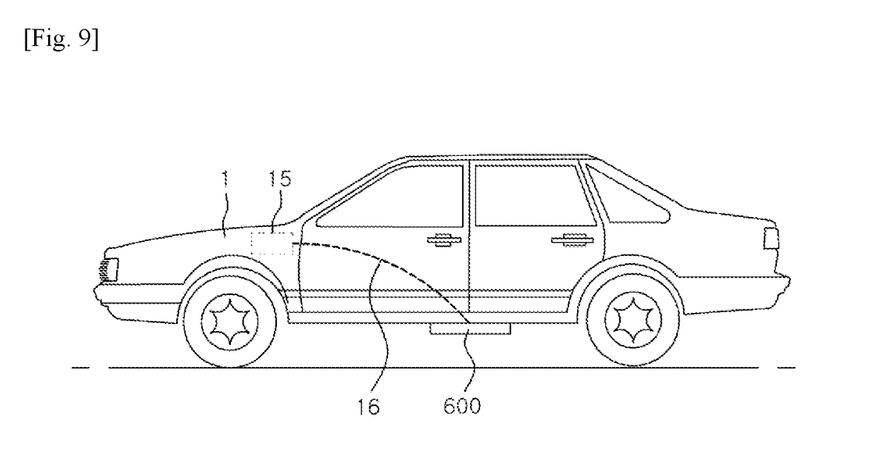
FIG. 9 shows an example in which a wireless charging device is applied to an electric vehicle.

For example, the cooler may comprise an automobile air conditioner. Specifically, as shown in FIG. 9, the air conditioner provided inside the transportation means (1) may be used as the cooler (15), and the air conditioner may be connected to the connection channel (16) connected to the inlet and outlet of the microchannel of the wireless charging device (600). As a result, effective heat dissipation may be possible even if a separate cooler is not provided.

In addition, the wireless charging device may further comprise a device, for example, a circulation pump for generating a flow of fluid in the microchannel.

Fluid

The wireless charging device may further comprise a fluid for cooling that circulates through the microchannel and the cooler. The fluid may transfer the heat generated in the magnetic material to the outside. Specifically, the fluid may transfer the heat generated in the magnetic material to the cooler.

The fluid may be gas or liquid, for example, air, water, or other liquid or gaseous fluids used as a refrigerant.

Specifically, the fluid may be air, water, oil (e.g., engine oil), alcohol (e.g., ethylene glycol, propylene glycol, antifreeze), or a mixture thereof.

The fluid may have a thermal conductivity of 0.022 W/m·K to 0.69 W/m·K at 20° C., for example, 0.022 W/m·K to 0.038 W/m·K, 0.57 W/m·K to 0.69 W/m·K, 0.13 W/m·K to 0.15 W/m·K, or 0.24 W/m·K to 0.69 W/m·K.

The fluid may have a density of 0.75 kg/m$^3$ to 1,100 kg/m$^3$ at 20° C., for example, 0.75 kg/m$^3$ to 1.39 kg/m$^3$, 840 kg/m$^3$ to 1,000 kg/m$^3$, 800 kg/m$^3$ to 900 kg/m$^3$, or 840 kg/m$^3$ to 1,100 kg/m$^3$.

The fluid may have a heat capacity of 1,005 J/kg·K to 4,250 J/kg·K at 20° C., for example, 1,005 J/kg·K to 1,023 J/kg·K, 4,150 J/kg·K to 4,250 J/kg·K, 1,700 J/kg·K to 2,500 J/kg·K, or 2,500 J/kg·K to 4,250 J/kg·K.

The fluid may have a thermal diffusivity of $6 \times 10^{-8}$ m$^2$/s to $4,960 \times 10^{-8}$ m$^2$/s at 20° C., for example, $1,570 \times 10^{-8}$ m$^2$/s to $4,960 \times 10^{-8}$ m$^2$/s, $10 \times 10^{-8}$ m$^2$/s to $20 \times 10^{-8}$ m$^2$/s, $6 \times 10^{-8}$ m$^2$/s to $10 \times 10^{-8}$ m$^2$/s, or $9 \times 10^{-8}$ m$^2$/s to $20 \times 10^{-8}$ m$^2$/s.

According to a specific example, the fluid may have a thermal conductivity of 0.022 W/m·K to 0.038 W/m·K, a density of 0.75 kg/m$^3$ to 1.39 kg/m$^3$, a heat capacity of 1,005 J/kg·K to 1,023 J/kg·K, and a thermal diffusivity of $1,570 \times 10^{-8}$ m$^2$/s to $4,960 \times 10^{-8}$ m$^2$/s at 1 atm and 20° C.

According to another specific example, the fluid may have a thermal conductivity of 0.57 W/m·K to 0.69 W/m·K, a density of 840 kg/m$^3$ to 1,000 kg/m$^3$, a heat capacity of 4,150 J/kg·K to 4,250 J/kg·K, and a thermal diffusivity of $10 \times 10^{-8}$ m$^2$/s to $20 \times 10^{-8}$ m$^2$/S at 20° C.

According to still another specific example, the fluid may have a thermal conductivity of 0.13 W/m·K to 0.15 W/m·K, a density of 800 kg/m$^3$ to 900 kg/m$^3$, a heat capacity of 1,700 J/kg·K to 2,500 J/kg·K, and a thermal diffusivity of $6 \times 10^{-8}$ m$^2$/s to $10 \times 10^{-8}$ m$^2$/s at 20° C.

According to still another specific example, the fluid may have a thermal conductivity of 0.24 W/m·K to 0.69 W/m·K, a density of 840 kg/m$^3$ to 1,100 kg/m$^3$, a heat capacity of 2,500 J/kg·K to 4,250 J/kg·K, and a thermal diffusivity of $9 \times 10^{-8}$ m$^2$/s to $20 \times 10^{-8}$ m$^2$/s at 20° C.

Support Unit

As shown in FIG. 6, the wireless charging device (600) may further comprise a support unit (660) for supporting the coil unit (610). The material and structure of the support unit may be a material and structure of a conventional support unit used in a wireless charging device. The support unit may have a flat plate structure or a structure in which a groove is formed in compliance with a coil shape to fix the coil unit.

Housing

As shown in FIGS. 8a and 8b, the wireless charging device (600) according to an embodiment may further comprise a housing (601) for accommodating the components described above.

The housing allows such components as the coil unit, the shield unit, and the magnetic unit to be properly disposed and assembled. The material and structure of the housing may be a material and structure of a conventional housing used in a wireless charging device. It may be appropriately designed according to the components adopted therein.

Spacer

In addition, the wireless charging device according to an embodiment may further comprise a spacer for securing a space between the shield unit and the magnetic unit. The material and structure of the spacer may be a material and structure of a conventional spacer used in a wireless charging device.

Transportation Means

The wireless charging device can be advantageously used in a transportation means such as electric vehicles that require large-capacity power transmission between a transmitter and a receiver.

Figure 10:
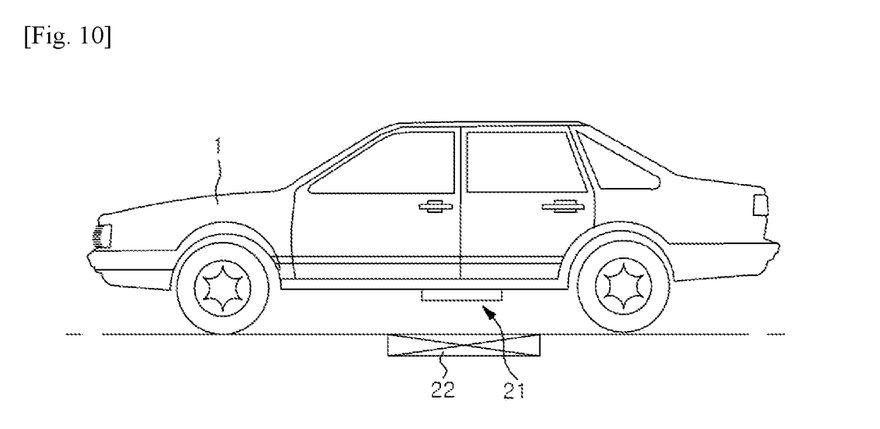
FIG. 10 shows an electric vehicle provided with a wireless charging device as a receiver.

FIG. 10 shows a transportation means, specifically, an electric vehicle provided with a wireless charging device. Since it is provided with a wireless charging device on its lower side, it may be charged wirelessly in a parking area equipped with a wireless charging system for an electric vehicle.

Referring to FIG. 10, the transportation means (1) according to an embodiment comprises a wireless charging device according to the embodiment as a receiver (21). The wireless charging device may serve as a receiver for wireless charging of the transportation means (1) and may receive power from a transmitter (22) for wireless charging.

As described above, the transportation means comprises a wireless charging device, and the wireless charging device has a configuration as described above.

Specifically, the wireless charging device adopted in the transportation means comprises a coil unit; a shield unit disposed on the coil unit; a magnetic unit disposed between the coil unit and the shield unit; and a channel provided inside or adjacent to the magnetic unit, wherein a fluid for cooling is introduced into the channel and comes into contact with the magnetic unit.

The configuration and characteristics of each component of the wireless charging device adopted in the transportation means are as described above.

The transportation means may further comprise a battery for receiving power from the wireless charging device. The wireless charging device may receive power wirelessly and transmit it to the battery, and the battery may supply power to a driving system of the electric vehicle. The battery may be charged by power transmitted from the wireless charging device or other additional wired charging devices.

In addition, the transportation means may further comprise a signal transmitter for transmitting information about the charging to the transmitter of the wireless charging system. The information about such charging may be charging efficiency such as charging speed, charging state, and the like.

The invention claimed is:

1. A wireless charging device, which comprises a coil unit; a shield unit disposed on the coil unit; a magnetic unit disposed between the coil unit and the shield unit; and a channel provided inside or adjacent to the magnetic unit, wherein a fluid for cooling is introduced into the channel and comes into contact with the magnetic unit,
wherein the shield unit is disposed to be spaced apart from the magnetic unit by a predetermined interval,
wherein the wireless charging device comprises an air circulation unit, as the channel, positioned between the magnetic unit and the shield unit, and
wherein air, as the cooling fluid, is introduced into the air circulation unit and comes into direct contact with the surface of the magnetic unit and the surface of the shield unit.

2. The wireless charging device of claim 1, wherein the air introduced into the air circulation unit is supplied from an external air conditioning system.

3. The wireless charging device of claim 1, which further comprises an inlet pipe connected to allow air to be introduced into the air circulation unit and an outlet pipe connected to discharge air from the air circulation unit, both being disposed on one side or both sides of the air circulation unit.

4. The wireless charging device of claim 1, wherein the air circulation unit further comprises a guide wall formed to allow the air to flow.

5. The wireless charging device of claim 1, wherein the magnetic unit further comprises at least one hole through which air is introduced from the air circulation unit and a cooling channel provided in the magnetic unit and connected to the hole to circulate the air.

6. The wireless charging device of claim 1, wherein the temperature inside the air circulation unit is 5° C. to 50° C., and the humidity inside the air circulation unit is 30% to 80%.

7. The wireless charging device of claim 1, wherein the wireless charging device comprises a microchannel, as the channel, provided inside the magnetic unit.

8. The wireless charging device of claim 7, wherein the microchannel has a total internal volume of 5% to 70% based on the total volume of the magnetic unit.

9. The wireless charging device of claim 7, wherein the microchannel has an internal diameter of 0.1 mm to 5 mm.

10. The wireless charging device of claim 7, wherein the microchannel is disposed to correspond to a region in which the coil unit is present.

11. The wireless charging device of claim 7, wherein the magnetic unit comprises a binder resin and a magnetic powder dispersed in the binder resin.

12. The wireless charging device of claim 7, wherein the wireless charging device further comprises a cooler connected to the microchannel, a fluid for cooling circulates and flows through the microchannel and the cooler, and the cooler cools the fluid by air cooling or water cooling.

13. A transportation means, which comprises a wireless charging device, wherein the wireless charging device comprises a coil unit; a shield unit disposed on the coil unit; a magnetic unit disposed between the coil unit and the shield unit; and a channel provided inside or adjacent to the magnetic unit, and a fluid for cooling is introduced into the channel and comes into contact with the magnetic unit,
wherein the shield unit is disposed to be spaced apart from the magnetic unit by a predetermined interval,
wherein the wireless charging device comprises an air circulation unit, as the channel, positioned between the magnetic unit and the shield unit, and
wherein air, as the cooling fluid, is introduced into the air circulation unit and comes into direct contact with the surface of the magnetic unit and the surface of the shield unit.

* * * * *